United States Patent [19]
McCoy

[11] 3,857,752
[45] Dec. 31, 1974

[54] STRUCTURAL MEMBER EMPLOYING RANDOM HONEYCOMB STRUCTURE

[76] Inventor: Wallace W. McCoy, 1041 E. Green St., Glendale, Calif. 91101

[22] Filed: Apr. 7, 1972

[21] Appl. No.: 242,048

Related U.S. Application Data

[62] Division of Ser. No. 15,364, March 2, 1970, Pat. No. 3,664,076.

[52] U.S. Cl............... 161/161, 161/162, 161/168, 161/169, 161/170, 52/309
[51] Int. Cl............................................. B32b 5/16
[58] Field of Search ........... 161/168, 169, 160, 161, 161/162; 52/309

[56] References Cited
UNITED STATES PATENTS

| | | | |
|---|---|---|---|
| 1,489,567 | 4/1924 | Weiss | 161/169 |
| 1,888,841 | 11/1932 | Wenzel et al. | 52/404 |
| 1,923,195 | 8/1933 | Finck | 52/404 |
| 2,175,630 | 10/1939 | Kiesel | 52/404 |
| 2,725,271 | 11/1955 | Cunningham | 52/309 |
| 2,849,758 | 9/1958 | Plumley et al. | 52/309 |

Primary Examiner—William J. Van Balen
Attorney, Agent, or Firm—John E. Wagner

[57] ABSTRACT

This disclosure involves a form of prefabricated structure such as commercial or industrial buildings, houses or enclosures employing an external skin bonded to an intermediate structural and insulating filler with an inner surface skin similarly bonded to the filler material. The external skins are preferably resin bonded glass fiber and the intermediate filler composes a random honeycomb structure made of cellulosic material, such as individual pieces of paper of random size each rigidified and bonded to adjacent pieces by a resinous binder which is compatible with the binder of the skins. The structure is shown in continuous panels and actually three dimensional structure configurations as well as discrete structural elements which may be used to replace comparable structural elements normally made of wood. Disclosed also are processes for continuous manufacture of structures employing the concept of this invention either in the factory or on site.

The same basic structure is shown in various configurations. Illustrated are a number of panel sections employing the same structure arrangement but different filler density whereby the load bearing strength of the panel may be controlled and its insulating properties varied as well. Structural strength can also be varied by changing the dimensions and concentrations of resin/fiberglas of either or both external skin surfaces. Disclosed also are individual structural elements produced from waste paper material and resin bonded skins.

8 Claims, 20 Drawing Figures

PATENTED DEC 31 1974 3,857,752

STRUCTURAL MEMBER EMPLOYING RANDOM HONEYCOMB STRUCTURE

This is a division, of application Ser. No. 015,364 filed Mar. 12, 1970 now U.S. Pat. No. 3,664,076.

BACKGROUND OF THE INVENTION

Given a careful analysis, the construction of houses has undergone only slight changes in the last one hundred years. The most prevalent form of construction remains the balloon construction form of load bearing stud walls covered by exterior sheathing and an interior facing. This mode of construction developed after the Chicago fire has become the standard of the industry. In the fields of industrial and commercial construction, significant advances have been made using such techniques as curtain wall, panel and precast lift wall approaches. Even these techniques do not fully utilize the advances which have been made in materials technology.

One example is in the area of resin bonded fiberglas, a material commonly used in automotive and marine fields but virtually unused in housing structures. Another material advance which is just now reaching the housing field is the use of ferroconcrete structures. This material and form of construction, however, is incompatible with the need for thermal and sound insulation since it produces a thin (⅜ to ¾ in.) highly conductive wall. In addition to the failure to use the new materials available, housing construction is fast depleting our major natural resource, our forests. Despite restoration, the drain is continuous and with the current need to expand housing, the rate will be accelerated.

The objects of this invention are all accomplished by the various embodiments basically composed of a panel structure including two skin surfaces, preferably of resin bonded fiberglas separated by an intermediate filler comprising random oriented resin rigidified particle of fragmented paper or other cellulostic material (interspaced) with intermediate random voids. The structure when viewed in section exhibits the general appearance of a random honeycomb. The intermediate filler may be composed of cellulostic solid waste material that is currently a bane of current urban existance and in this way is expected to reduce the drain on our forests.

BRIEF STATEMENT OF THE INVENTION

I have determined that a major step forward has been made in construction with the production in situ of continuous panels employing and including outer skin, inner skin interconnecting insulation and structural core or fill to form a completed structure of a shell in one continuous operation. Given this basic structure with a minimum of seams and a minimum of hand-carrying and holding by individuals that cost the time of construction can be greatly reduced. I have also determined that interior and exterior surface treatment or finish can be selected or produced during the construction of the structure. I have further determined it is possible to produce a single structural form which can be made to provide the required load bearing strength and insulation capability and the two can be varied relatively independently to produce any combination desired.

I have also found the structure is made up by a pair of skin-like surface members which are hand preferably resin bonded as indicated above and are in spaced parallel relationship. Inbetween the two parallel skins are a plurality of random oriented planar and non-planar pieces of cellulostic material with a resinous binder. The cellulosic pieces are preferably produced by random tearing of sheets of the material to produce edge fibers and in certain embodiments, the individual pieces are creased to provide a degree of inherent structural rigidity. The pieces with their impregnating resin constitute relatively rigid interconnecting members forming a random honeycomb-like filler. These pieces are bonded to adjacent surface skins by the same or compatible bonding agent as used for the filler.

DESCRIPTION OF THE DRAWINGS

The foregoing features of this invention may be more clearly understood from the following detailed description and by reference to the drawings in which.

Figure 1:
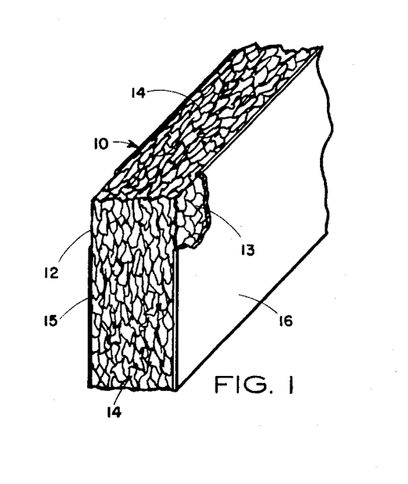
FIG. 1 is a perspective view of a structural panel in accordance with the invention with a portion of the outer skins cut away to expose the core material.

Now refer to FIG. 1 wherein a perspective view of a structural panel 10 is shown having a core 11 with generally coplanar surfaces 12 and 13, and edges 14 exposed. The core structure illustrated is comprised mainly of loose cellulose-base fibrous material which has been impregnated with a plastic binder and compressed into the generally flat panel form shown. Surfaces 12 and 13 are relatively smooth in texture, having assumed the approximate surface conditions of the integrally-bonded outer skins 15 and 16. Edges 14 are conversely somewhat rough and irregular, being illustrated as if the panel has been sawn from a larger panel, and showing many edges and partial surfaces of particulate material and the interstices therebetween.

Figure 2:
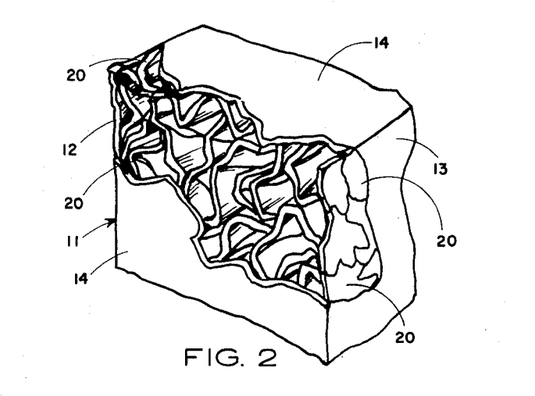
FIG. 2 is an enlarged perspective view of the corner of the core material shown in FIG. 1.

Now refer to FIG. 2 wherein an enlargement of the corner of the core 11 in FIG. 1 is shown in sufficient magnification to more clearly illustrate the structural make-up. A plurality of thin, irregularly shaped and irregularly formed particles 20 are randomly oriented in a loosely-compressed rigid form whereby their edges and surfaces provide generally flat and relatively smooth surfaces 12 and 13. The random orientation of the particles 20 cause the resin-impregnated particles to intersect in irregular edge-to-edge, surface-to-surface, and edge-to-surface junctions whereby the total volume included is substantially voids between the particles, and the rigidity of the structure is developed by the stiffness of many open and closed cells formed by the resin-stiffened complex-formed particles spanning between resin-bonded intersections. The cells appear as a random jumble of interlocked polyhedral shapes, very much like a form of honeycomb core with the cell walls in complex form and scrambled in every possible direction.

The core of the fragmentary cross section illustrated in FIG. 2 nominally has a grayish cast and a rough texture on the edge similar to course cork board. On closer examination, however, the rough texture is not due to course, solid particles but to thin typically bent plateletts of material clearly identifiable as fragments of newsprint, rigidified by resin.

Great amounts of voids are a dominant feature. The voids range widely in size and shape, with the maximum size on the order of an inch long and varying widths, up to ¼ of an inch. Loose plateletts break when so bent. Throughout the exposed surfaces, many cellulose fibers, interlocking, adhering to flat surfaces of paper or just free are very obvious.

Experimental cores produced for tests, discussed later, when held in the air with one hand and struck soundly with the knuckles of the other hand, give a damped ringing tone reminiscent of a wood plank, although if portion struck may also be accompanied by a small crushing sound, due to the collapsing void in that immediate area.

The paper fragments visually range in size from roughly 2 inches down to the limit of unaided vision. There appears to be a relatively even distribution of size with an apparently large amount of free (at one time) cellulose fibers.

The copius amount of voids are best seen in FIG. 2, along the edges. It is difficult in these illustrations to depict the wide ranging sizes present, not the cellulostic fibers that are everywhere. A preferred size is ½ square inch.

Figure 3:
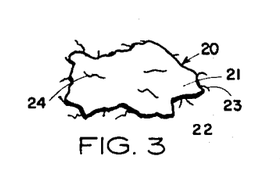
FIG. 3 is a perspective view of a single particle of cellulose fiber based material comprised of fragmented paper.

Now refer to FIG. 3 wherein a typical particle of cellulose material 20 is shown in a preferred embodiment employing waste newsprint paper as the cellulose-base material. The particle 20 has a generally flat surface 21, having small creases 24, bounded by very irregular edge 22 generated by a tearing action, and is characterized by a ragged pattern with edge fibers 23 torn loose and extending from the torn edge. Experience has shown that more sharply cut particles do not have the capability of retaining the impregnating resins at the particle intersections, whereas the torn edges promote better joint adhesion and improved structural strength in the finished panel.

Figure 4:
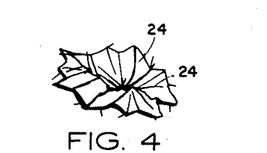
FIG. 4 is a perspective view of a single particle of fragmented paper after deforming.

Now refer to FIG. 4 wherein a particle 20 is shown deformed considerably out of its original planar form; and in which a plurality of creases or folds 24 are provided in order to enhance the size and number of the voids between the particles in the completed structural material, and to increase the column strength of the individual particles. Several methods are employed to produce and increase the folds in the particles. Initially, the tearing is done in a fragmentation process which strikes and tears the paper with considerable speed and violence, creating the smaller creases 24 shown in FIG. 3. Then the resin impregnation is accomplished in a mixing operation having an impeller action with sufficient vigor to further deform the particles. Subsequently, the compression of the mass of material both in injecting the material into a press and in compressing the panel to the desired thickness and density increases the folding by crumpling the precreased particles. Structural strength can also be varied by changing the dimensions and concentrations of resin/fiberglas of either or both external skin surfaces.

Now refer again to FIG. 1 wherein skins 15 and 16 are shown defining planar surfaces on each side of the panel 10. The composite structure is formed as the resin-impregnated skins 15 and 15 and the mass of resin-impregnated loose, crumpled particles are simultaneously shaped and cured into an integral unit. The skins 15 and 16 may be completely omitted from the panel for some specific structural applications where the surface texture and durability of the molded core faces 12 and 13 is adequate. Various resin concentrations will alter the appearance considerably, as will the texture of the mold surface used. Many of the panels fabricated as experimental models have exhibited pleasing color and textures, and have a surface appearance very similar to dark-colored cork board paneling.

The skins are preferably made of resin-bonded glass fibers. The glass fibers may be in the form of fabric, woven roving, chopped roving, random mat and pre-pregs of any of these. The glass fibers used generally in experiments to date have been of the fabric variety, for ease of handling although chopped gun blown mat and random mat have been found to be satisfactory. Normal glass fiber length for the blown random mat was 4½ inches. The glass fabric used for the bulk of the experimental panels was low cost, "gray goods," 7½ oz. triple strand fabric.

The resin system used in the skins is commercially available polyester type with the following composition:

Resin System,
Dilution Monomer,
Inhibitor,
Activator, dimethyl phthalate, 0.6%,

Catalyst, methyl ethyl ketone peroxide, 1½%, all percentages are by weight compared to the basic resin-monomer weight.

In some applications, it is desirable to have a panel which has a very durable and weather resistant surface on one side, and a softer finish on the other side, as might be characterized by an outside wall of a home or office. A suitable panel may be made by leaving the texture of the core exposed inside, and providing an integral outside skin of a very durable and weather resistant material, such as, laminated fiberglas.

There are similarly many applications where it is imperative to have very durable finishes on both surfaces, such as homes inhabited by small children, schools, and other high traffic buildings. In these cases, suitable skins such as laminated fiberglas, polyvinyl sheets, and even wood or simulated wood may easily be included at the time of panel manufacture, and become permanent, integrally-bonded parts of the panel structure.

The nature of the manufacturing process wherein both the skins and the core are formed and cured as an integral unit makes a much wider range of skin materials not only usable, but very practical from the viewpoint of cost, strength, and appearance. Since the skin material before curing may be nothing more than a resin-wetted, limp membrane, and the surface shape, texture and finish is replicated from the mold surface, then the skin material selection is extremely broad. For example, fiberglas cloth, which is usually coarse, loosely-woven fabric, when saturated with resin and formed in a mirror-smooth mold will take on the mold finish and become a glossy, impervious, and easily maintained wall surface. Similarly, other textiles may be excellent choices for decorative walls to produce very durable and attractive surfaces ranging from cotton prints through cheese-cloth to colored burlap, where the fabric is visible, any texture is available from the mold surface, and the final wall could resist even steam-cleaning if necessary.

There are less complex skin materials, such as papers, that are suitable for integral panel formation, whereas they would not be practical to bond to a previously made core, such as in the processes used for honeycomb panel manufacture. Compression-bonding of a geometric honeycomb sandwich panel invariably leaves the pattern of the hexagonal cells on the surface of the paper faces, just as the longitudinal corrugations are visible on corrugated paper board. Since in this invention the core particles are randomly distributed and partially crushed before curing, the flat surfaces of the core beneath the skins are relatively smooth, planar and provide added structural strength and broad support areas for the skins. As a result, there is greatly reduced printthrough of the core texture, and there is never a regular geometric pattern visible. As a result, the surface skins may be selected from thinner and lighter materials than is possible with a geometric patterned core.

The use of Kraft papers is very common in building materials, and is well suited to use in the invention for applications having little or no mold texturing. In such decorative finishes as simulated brick or stone, the skin material must stretch to conform to the depth changes in the mold, and therefore softer papers, including creped papers, paper towelling and soft industrial tissues, are more suitable.

The structural properties of the panels may be varied to best suit the stresses involved in the end use of the panels. The two basic areas of design parameters to be varied are in the strength of the core materials and in the strength of the integral skins. In applications requiring huge puncture resistance, the need for heavy skins is obvious. In applications requiring resistance to heavy column loading, it is necessary to provide higher strength and high density in the core materials. In applications requiring high bending strength, such as for unsupported spans, a stronger lower skin in tension is combined with a fairly dense core to carry the compression loads.

Test panels were built up by hand using the following process. A mold was made using an aluminum plate bottom surface which has a coating of Teflon (tm) and sides of wood coated with the parting agent. A layer of glass fabric, above described, is placed on the bottom plate and saturated with the same or compatible catalyzed resin. The required amount of the prepared core material is placed in the mold. (The required amount is determined by the desired compression ratio and the final thickness of the finished panel.) A sheet of glass fabric saturated with resin is placed over the top of the core material and the whole mass is compressed to the final desired thickness by weighting a top plate, which is of the same composition as the bottom plate. The entire assemblage is allowed to polymerize in the mold. On completion of the polymerization process, the assemblage is removed from the mold and additional layers of catalyzed resin are applied to the skin surfaces by brush or squegee, and allowed to polymerize. With the completion of this step, the test panels are finished.

A set of core samples were assembled to test the properties of the core material. The method of assembly was the same used for assembling the test panels by hand described above, but without applying either skin to the surfaces of the core. The appearance of the finished test cores were similar to the cores in the test panels.

Other material was used for potential core material. Dry straw, intended for feed use, was found very satisfactory. The length of the straw ranged from 12 inches down to material that looked and behaved like powder. There was also present 5 to 10% dirt and other ill-defined refuse material. This seemed to have little negative effect on the strength of the material.

Still another material tried was fresh grass clippings and dropped elm leaves. The presence of the water from the fresh green grass acted like an inhibiter to the polymerization process. It was necessary to bake this sample for 12 hours at 180°F before the core sample was acceptable. The grass and leaves were used au natural, without fragmenting or masticating them. There was very little impregnation of the leaves or grass by the resin. This produced a core that has unacceptable strength. If the material were dried and fragmented before assembly, then the core produced would be acceptable.

The ratio of resin to paper is on a weight basis. The final density is in pounds per cubic foot. The equivalent solid density is found by taking the estimated solid density of the resin at 107 pounds per cubic foot and the density of used newsprint at 36 pounds per cubic foot, applying the to paper ratio as a factor to determine what the density of the entire assemblage would be if there were no air voids in it. The ratio between this value and the actual finish density is taken as the ratio of solid to void space in the core.

The newspaper used for the core contained a wide variety of paper types, including "slick" surface magazines. All of these paper types were found usable except paper that was treated with chemicals that prevented the absorpsion of the resin into the fibers of the paper. If the percentage of this type of paper was kept below 10% or if the paper was treated to increase the absorbant properties, then this paper had little delitorius effect.

Compression tests were made on the assembled panels. The panels withstood compressive loads up to 160 pounds per square inch with no signs of failure nor visible damage. The skins for this test panel were 0.05 inches thick, containing one layer of 7½ oz. gray goods glass fabric. The core used in the test panel had properties similar to core sample four that will be described below.

The physical properties of the core material were determined from the skinless core samples described earlier. Various ratios of resin to paper were used as were different ratios of the compression of the core material. The results of this test sequence are summarized:

| CORE NO. | RATIO RESIN TO PAPER BY WEIGHT | FINAL DENSITY | % VOID | COMPRESSIVE LOADING WITHOUT PERMANENT DEFORMATION lb./in² |
| --- | --- | --- | --- | --- |
| 1 | 1.94 | 5.98 | 93 | Not tested |
| 2 | 1.40 | 9.75 | 89 | Not tested |
| 3 | 4.37 | 11.39 | 89.2 | 45 |
| 4 | 2.33 | 13.30 | 86.7 | 20 |
| 5 | 1.375 | 15.87 | 88.3 | 45 |
| 6 | 5.14 | 16.01 | 85.8 | 90 |
| 7 | 2.63 | 17.00 | 84 | Over 180 |
| 8 | 2.00 | 19.90 | 80.6 | Over 180 |
| STRAW | 1.775 | 24.2 | | Not tested |
| GRASS | 20.00 | 18.96 | | 45 |

Panels have been fabricated and tested for mechanical properties without any skins, with skins as minimal as lightweight chessecloth, and with much heavier skins, including chopper fiberglas matting underlying woven glass fabric. Core samples have also been fabricated and tested using varying densities of paper particles and resin concentrations. In some experiments, natural materials are used in part or wholly as the particles. These experiments were generally successful where a natrual organic substitute closely approximated the configuration and absorption of the paper particles. Where the natural substitute particles were generally flat or at least thin and crinkled, and where they could be masticated to increase crumpling and provide a loose pattern of edge fibers, the ideal particles were simulated closely enough to provide structural soundness. A number of samples made in densities of from 6 to 20 pounds per cubic foot, having total void volumes of from 80% to 94%, and mechanical properties well suited to sawing, drilling, nailing, and the like.

Figure 5:
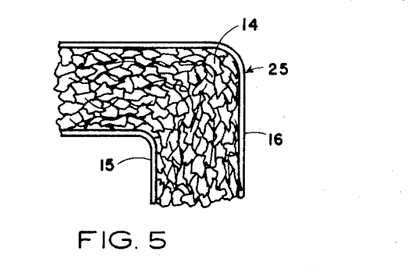
FIG. 5 is a cross sectional view of a corner of a complex panel structure.

Now refer to FIG. 5 wherein a more complex shape for a structure is shown in a typical corner cross section 25. The core material 14, as shown in FIG. 1, extends between the two skins 15 and 16 to form a rigid structure. The complete structure having the corner shape is resin-impregnated, compressed and cured in a suitable mold providing the finish and shape of the structure. All of the same parameters that are variable for a simple panel are also variable in the more complex structural members, the only significant difference being the shape of the mold used to produce the structure.

Figure 6:
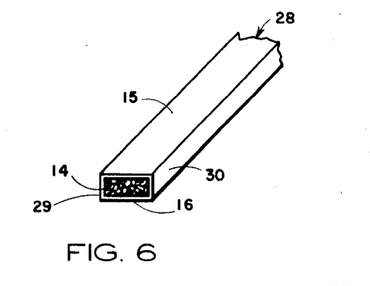
FIG. 6 is a perspective view of a structural beam having integrally-bonded skin surfaces.

Now refer to FIG. 6 wherein a structural element 28 is shown having a core 14 and side skins 15 and 16, as shown in FIG. 1, and additionally having edge skins 29 and 30 to complete the longitudinal enclosure of the core 14 to form a completely encased structural shape. Each of the four skin finishes is produced by a mold surface which provides texturing and shape during curing of the resin-impregnated composite whereby the result is an integrally-bonded structural member. A typical example of the end result is a "2×4" dimensional alike and directly interchangeable with wood structures of the same dimension.

Figure 7:
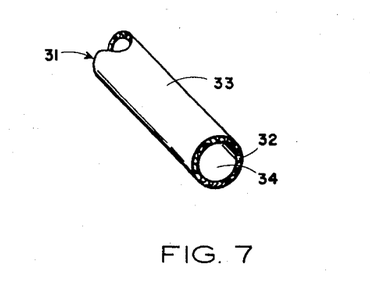
FIG. 7 is a perspective view of a pipe having inner and outer integrally-bonded skin surfaces.

Now refer to FIG. 7 wherein a pipe 31 is shown having a circular cross section core 32, surrounded by an outer skin 33 and lined with an inner skin 34. The core material 32 is made up of the material described in FIG. 2, and both the inner and outer skin finishes are produced by mold surfaces providing texturing and shape during curing of the resin-impregnated composite whereby the pipe is an integrally-bonded structural member.

Figure 8:
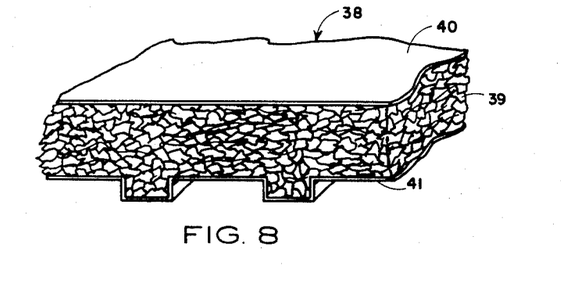
FIG. 8 is a perspective view of a structural panel having reinforcing ribs molded as a part of the lower skin surface.

Now refer to FIG. 8 wherein a ribbed panel 38 having a core 39 made up of the material described in FIG. 2, an upper skin 40, and a rib-contoured lower skin 41. Both of the skin finishes are produced by mold surfaces providing texturing and shape during curing of the resin-impregnated composite whereby the ribbed panel is an integrally-bonded structural member. In the configuration shown in FIG. 8, a unitary floor and support structure is produced. This continuous lower skin 41 forms the tension member of the assembly and the entire floor acts as a unitary structural and surface assembly. The thickness of the floor and skins, as well as filler-to-resin ratio, may be varied to produce a floor of the required strength and dimensional characteristics. The complete bonding of the numerous particles to each other and to the skin and the total absence of natural sheer planar in the structure enhance its structural integrity.

In each of the foregoing embodiments, the same structural combination is used. One characteristic of this invention is that the same combination may be used to produce a lightweight non-self-supporting filler to a structural member. The panels may be varied in thickness, density and size at will and in the production of continuous walls or panels, the thickness and density may even be varied as the structure is produced by varying the mandral separation and feed rate of material in the process described below. In this manner, for example, the same structure may be used as interior non-load bearing and as exterior or load bearing walls with only a change in the above parameters.

Figure 9:
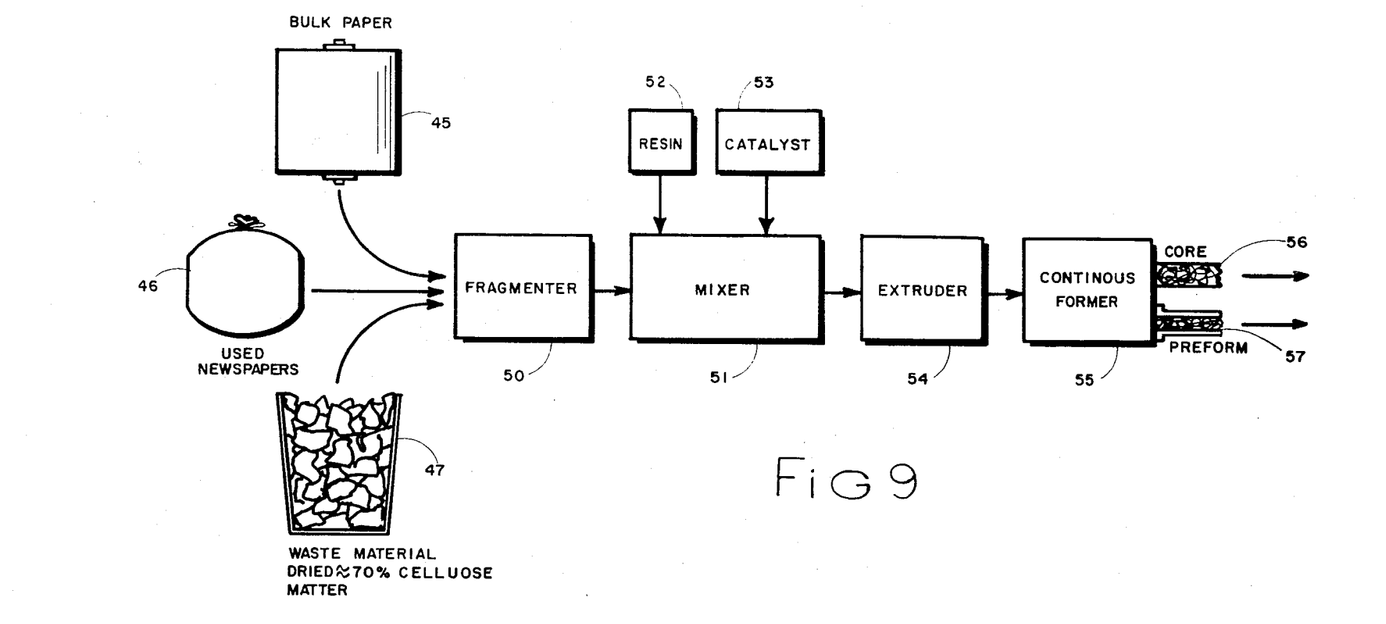
FIG. 9 is a block diagram of the manufacturing process for the preferred core material.

Now refer to FIG. 9 wherein a block diagram is shown for a preferred embodiment of the manufacturing process for the core material. Raw material for the particles is shown as bulk paper 45, used newspapers 46, and waste material 47. The selection of raw material depends on cost and availability. Almost any cellulose fiber-based material is usable, and studies have shown even man-made trash to average 70% cellulose fiber content. However, optimization of the mechanical properties of the core will require control limits on raw material density, absorbtivity and tearing characteristics. Optimum skin thicknesses are 0.05 to 0.1 inch.

The raw materials, preferably used newspapers 46 which are available in large volume at very low cost, are fed into a fragmenter 50. The fragmenter receives the paper into a chamber where high speed rotating fingers strike and tear the paper into at least lightly creased irregular fragments. The fragmented material is conveyed to a mixer 51 where rapidly rotating blades impact the fragments to further crease them and also mix in the resin 52 and catalyst 53. The resin is typically a polyester commercially available at low cost, including a resin system of unsaturated polyester with maleic and phthalic anhydrides and a styrene dilution monomer, using hydroquinone stablilizer and a cobalt napthenate promoter. The catalyst is typically methyl ethyl ketone peroxide.

The resin-impregnated particles are then conveyed to an extruder 54 which partially compresses the mixture, thereby increasing the creasing of the particles somewhat, and extrudes the mixture into a continuous former 55. The previously catalyzed resin-impregnated mass of particles is further compressed into a desired shape by mechanical means by the former 55 and is retained in the desired shape and becomes at least partially cured as the core material progresses through the former. The preferred embodiment of the manufacturing process for the core material is shown as a continuous process wherein the output is a structural member 56 of undetermined length having limited width, thickness and shape established by the continuous former 55. An alternate mechanization is a batch process whereby measured amounts of materials are processed in successive batches and the output is then a sequenced series of individual pieces having all dimensions controlled simultaneously.

The process for the manufacture of core material for integral curing with one or more skins is substantially the same, except for one significant change in the operating mode of the former 55. When skins are desired on the final structure, the former is adjusted to compress the core to slightly less than the desired final thickness, and the operating time and temperature are adjusted so the mixture does not cure in the continuous former. The output of the process then is not a rigid, cured core structure 56, but instead is a slightly oversize uncured preform 57 suited for additional processing to complete the panels structure. Either output may be selected as an operating mode of the same basic process and equipment.

Figure 10:
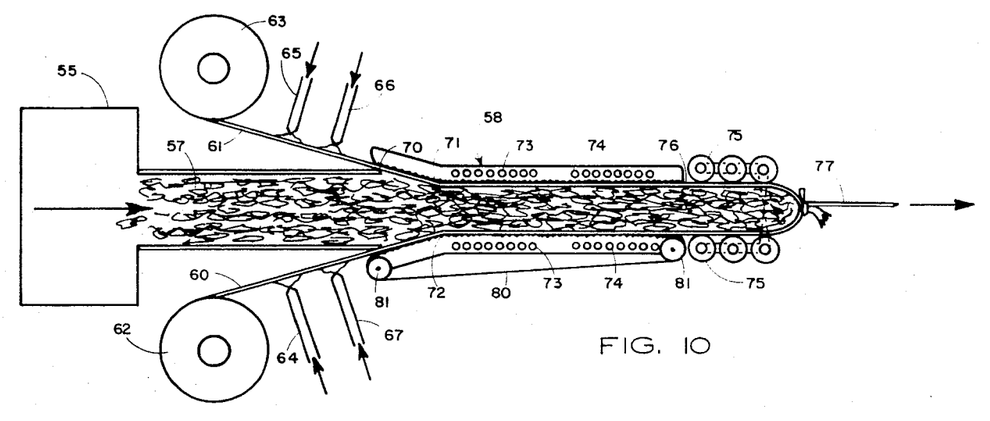
FIG. 10 is a cross sectional view of an extruder applying integrally-bonded skin surfaces to an uncured core preform to produce a composite panel.

Now refer to FIG. 10 wherein a simplified extruder 58 is shown producing a panel having exterior skins. The output of the former 55 as in FIG. 9 is shown producing an uncured resin-impregnated preform 57. The preform moves at a uniform rate synchronous with moving webs of skin membrane material 60 and 61 supplied from rolls 62 and 63, respectively. Webs 60 and 61 are impregnated with resin by applicators 64 and 65, and the resin is activated with catalyst by applicators 66 and 67. The webs 60 and 61 and core preform 57 move together at a flared entrance formed by the contour of the extrusion die wall 71 and 72. Temperature control as required by the panel thickness and resin characteristics is established by heater means 73 to promote curing, and by cooler means 74 to assist in removing exothermic heat from curing. The final taper of entrance 70 and the spacing between die walls establish the thickness and cross sectional contour of the finished panel.

The movement of the panel materials through the extruder is produced by three cooperating forces. First, the continuous former 55 supplies the preform under pressure which tends to make the core flow through the extruder. Second, rollers 75 and provided with external power and engage the cured walls of the finished panel 76 to pull the panel out of the extruding die walls 71 and 72. Third, a tension means 77 is provided to start the process in operation when the die may not yet be filled sufficiently for normal operation. Friction of the work against the die walls is controlled by the use of non-stick surfaces, such as Teflon, as well as commercial parting agents. The friction is minimized in most applications where the die walls must provide texturing for the outer surfaces of the skins. In order to replicate a complex three-dimensional surface, however minute in depth, the die surface must move along with the skin surface. In an extrusion process, this necessarily implies a continuous surface, much like a conveyor belt 80 shown partially supported by rollers 81.

Figure 10A:
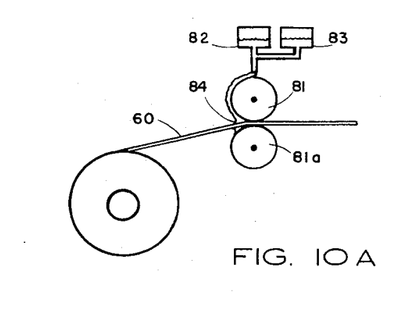
FIG. 10a is an alternate embodiment of a resin applicator for impregnating the surface skins.

Now refer to FIG. 10a wherein a means for very uniform application of catalyzed resin is shown as an embodiment of the combination of applicators 65 and 66 or the combination applicators 64 and 67. The web of skin material 60 passes between a pair of pressure rollers 81 and 81a. A resin reservoir 82 and a catalyst reservoir 83 supply resin and catalyst to the surface of roll 81, which in turn transfers the mixture to web 60 at the junction of the pressure rolls. Control of the flow rate of the resin mixture with respect to the velocity of the web will produce a meniscus 84 in which a constant rolling amd mixing of the resin mixture takes place, and permitting a uniform amount of the mixture to be carried with the web between the pressure rolls.

Figure 10B:
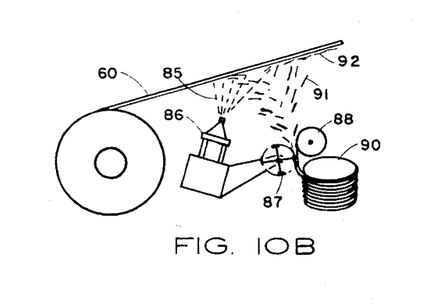
FIG. 10b is another alternate embodiment of a resin applicator for reinforcing and impregnating the surface skins.

Now refer to FIG. 10b wherein a means is shown for applying a skin material substantially made of non-woven fiber material, such as chopped glass fibers. The web 60 may be a very flimsy membrane, such as cheesecloth or thin tissue paper. A mixture of resin and catalyst 85 is sprayed from a mixing spray gun 86 incorporating cutting and impelling rolls 87 and 88 so driven as to draw fiberglass roving between the rolls and dispense cut fibers 91. The fibers 91 are spray coated with resin mixture 85 to become the resin-saturated matting 92 carried by the moving web 60.

Now refer again to FIG. 10 illustrating the cross section of an extruder 58 in the process of manufacturing a panel. Additional skins may be placed orthogonally to those shown in the illustration by simply duplicating the components shown at 90° to the section plane illustrated. This arrangement then extrudes structures having all four sides bounded by integrally-made surface skins. By varying the relative widths of the orthogonally placed webs and die surfaces structures may be produced continuously ranging from thin, edge-sealed panels to large, rectangular or square beams for structural use as illustrated in FIG. 6. Beams so extruded may duplicate the sizes of dimensioned lumber, so that 2×4's, 2×12's, or even 12×18's are available in unlimited length without grain, shrinkage, knots or warpage. The ability to vary density and skin strength at will offers the opportunity to match the structural properties of the beam closely to the loads expected.

Figure 11:
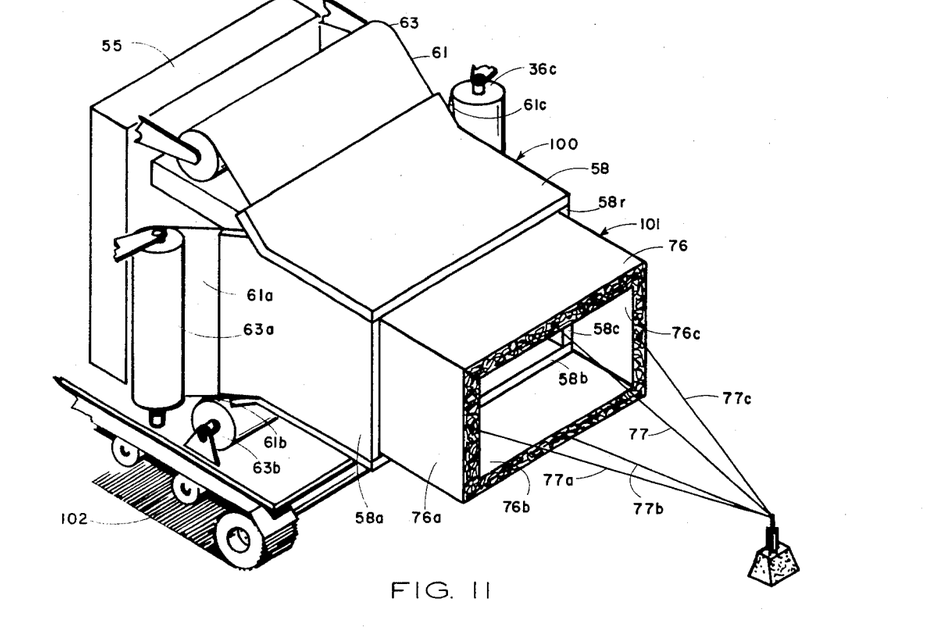
FIG. 11 is a perspective view of an extruding machine producing a hollow, rectangular structural member.

Now refer to FIG. 11 showing a perspective view of a machine 100 so arranged to extrude a completely closed hollow structure 101. The complete extruding machine 100 is comprised substantially of four orthogonally disposed extruders 58 as shown in FIG. 10. The extruding machine is carried on a means of self-propulsion 102, visible in part as a tracked vehicle. A continuous former 55, as described in the block diagram of FIG. 9 and shown in FIG. 10, supplies the core preform to the four interconnected extruders 58, 58a, 58b and 58c. The outer webs 61, 61a, 61b and 61c may be seen coming from supply rolls 63, 63a, 63b and 63c; the inner rolls and webs being hidden from view. Ideally, the webs 61, 61a–c are of greater width than their corresponding side of the finished structure to allow for overlap of the corners and increased strength. The four extruded panels 76, 76a, 76b and 76c are shown emerging from the extruding machine as a rectangular tube 101 having closed, integrally-made corners similar to the corner section described and illustrated in FIG. 5. The panel drive rollers 75 are not shown in FIG. 11, and the extrusion force is instead aided by tension members 77, 77a, 77b and 77c mutually fastened to an anchor means 103, whereby the free end of the tube 101 remains in a stationary position as the self-propulsion means 102 carries the machine along the surface. The structure 101 may be of sufficient size to constitute an entire room or enclosure.

Figure 12:
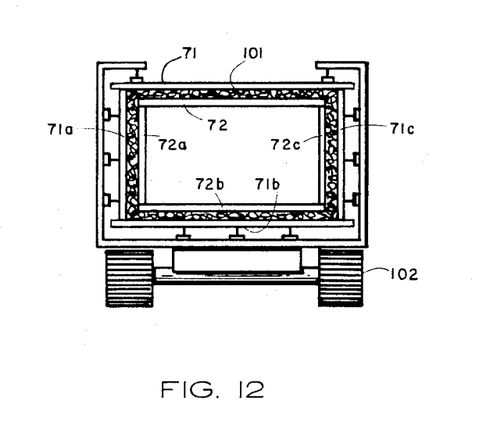
FIG. 12 is a cross sectional view taken transversely across the machine illustrated in FIG. 11.

Now refer to FIG. 12 wherein the transverse cross section taken through extruding machine 100 shows the rectangular tube 101 being formed inside and outside by the compression and shaping action of outer extrusion die surfaces 71, 71a, and 71b and 71c, and inner extrusion die surfaces 72, 72a, 72b and 72c.

Figure 13:
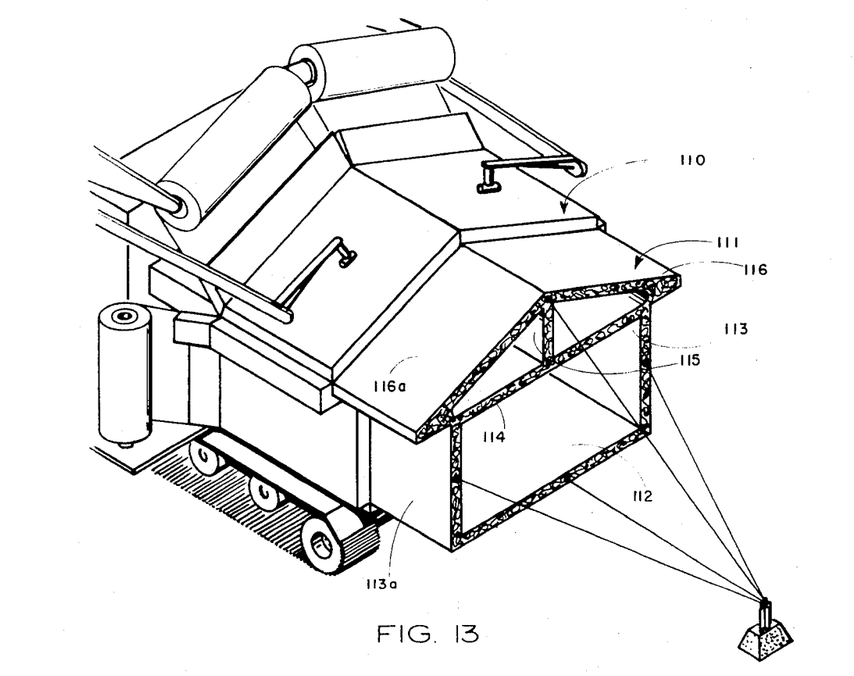
FIG. 13 is a perspective view of an extruding machine producing a hollow extrusion comprising the cross section of a gable-roofed building structure.

Now refer to FIG. 13 showing a perspective view of a more complex extrusion machine 110 so arranged as to extrude a multi-panel closed, hollow structure 111 of gable roof building form and including panels used as a floor 112, side walls 113 and 113a, a ceiling 114, a truss 115 and roof sections 116 and 116a. All of the interconnecting panels are integrally-bonded and formed by machine 110, similar in function to machine 100 shown in FIGS. 11 and 12, but more complex in shape, and comprised of interconnected extruders of the type shown in FIG. 10, arranged and sized to produce the gabled extrusion shape 111.

Figure 14:
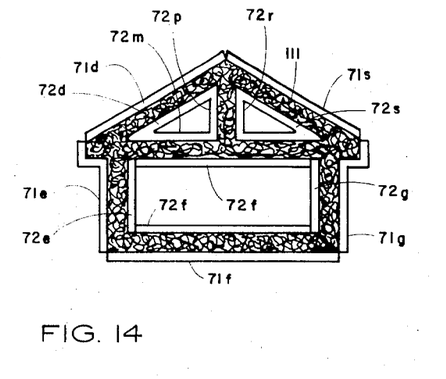
FIG. 14 is a cross sectional view taken transversely across the extrusion illustrated in FIG. 13.

Now refer to FIG. 14 wherein a transverse cross section taken across shape 11 shows a number of outer die surfaces 71d through 71s cooperating with a number of inner die surfaces 72d through 72s to compress and shape the gabled extrusion.

Figure 15:
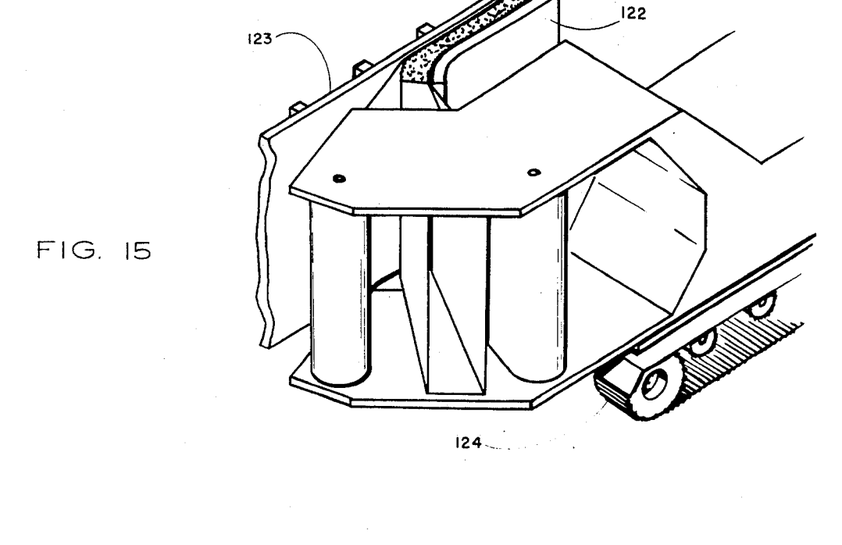
FIG. 15 is a perspective view of an extruding machine producing a vertically-oriented panel along a fixed form.

Now refer to FIG. 15 showing a perspective view of a single panel extrusion machine 120 so arranged as to extrude a vertical panel 121. The extruder itself, similar to extruder 58 in FIG. 10, has only one die surface 122 associated with the self-propelled machine, the other die wall 123 being a fixed form along which the machine 120 travels. The self-propelling means 124 moves the extruding machine along a wall similar to a concrete form wall, extruding the panel along the wall which may be later removed to expose the other surface of the panel. The freedom of movement of the machine permits the spacing between die wall 122 and the fixed form wall 123 to be varied in operation, thereby providing a means of constructing wall panels of continuously varying strength, weight and insulation values.

Figure 16:
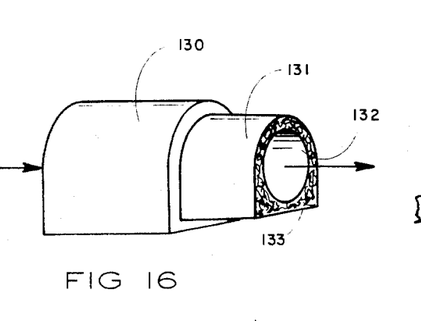
FIG. 16 is a simplified perspective view of an extruding machine producing a hollow tube having a flat bottom surface.

Now refer to FIG. 16 wherein a very simplified representation of an extruding machine 130 is shown producing a pipe or tunnel structure 131 including a circular internal surface and a generally flat exterior bottom surface 132. This extruded form is well suited for above-ground transmission of materials due to the design versatility that can be produced by the basic extrusion system. The inner skin of the tube may be made very high in hoop stress capability to carry fluids under pressure. The core material is an excellent insulator to reduce the possibility of overheating or freezing the transmitted fluids, and the outer skin offers security from ultra-violet degradation as well as malicious or accidental puncture of the inner, highly-stressed tube.

Figure 17:
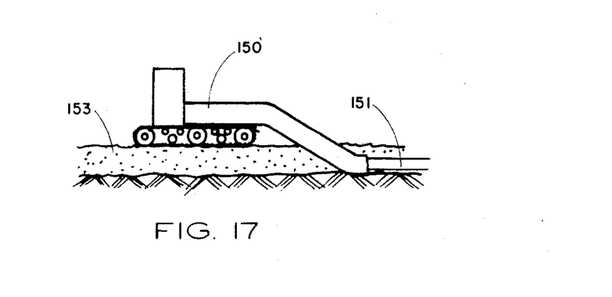
FIG. 17 is a simplified side elevation view of an extruding machine producing a continuous pipe in a trench.

Now refer to FIG. 17 wherein a simplified representation of a pipe laying extrusion machine 150 is shown manufacturing a pipe 151 by extruding the pipe in unstressed straight form directly into a trench 153. The advantages of this form of manufacture is in the ease of transportation of dense bulk raw materials to the pipeline site, as opposed to the less efficient transportation of bulky factory-made pipe lengths, and the total elimination of the need for welding or couplings dictated by the length of a truck bed.

Figure 18:
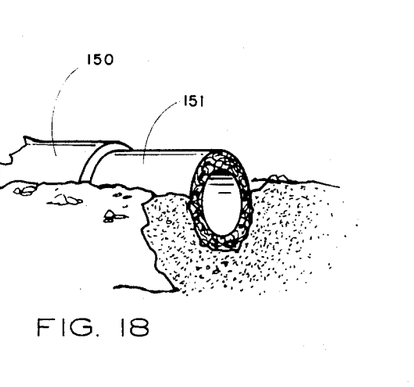
FIG. 18 is an enlarged perspective view of the end of a machine as in FIG. 17, producing a partially entrenched pipe.

Now refer to FIG. 18 showing an enlarged view of the end of the extruder of the machine 150 as illustrated in FIG. 17, with the pipe only partly entrenched. In the configuration shown in FIG. 18, the trench may actually act as the lower-half mold for the insulating filler and only employ an outer skin 152 on the upper half with a continuous inner liner 153. This system results in some saving of material in non-pressure applications where a minimum of cost is the predominant factor.

In all of the foregoing figures, the concept of this invention and its various applications in modes of insitu production have been illustrated. The primary characteristic of the invention relates to the use of resin rigidifing discrete particles inter-laced with large void areas, while used alone or in combination with protective surface skins bound to the rigidified particles. One specific resin system is disclosed in the application. It is recognized that other systems in accordance with well-known practice in the plastics art might be used. Similarly, two compatible systems may be used—one for the filler and another for the skin. The selection of the particular resin particles will be dictated primarily on the basis of the application for the final structure and the economics, since the resin typically constitutes the major cost of the structure.

Employing the in situ production of continuous structures, the labor cost of production has been minimized. These steps of handling, transportation, and erection of the structures have been virtually eliminated.

The above-described embodiments of this invention are merely descriptive of its principles and are not to be considered limiting. The scope of this invention instead shall be determined from the scope of the following claims including their equivalents.

What I claim is:

1. A structural member comprising a continuous skin of resin bonded fiberglass enclosing a filler of random oriented cellulostic particles of at least 70% cellulostic content rigidified with resin compatable with the skin resin and in bonded engagement therewith;

said particles in three dimensional random orientations intersecting in irregular edge to edge, surface to surface and edge to surface junctions with edge fibers of adjacent particles in bonded engagement constituting a mass of rigid material and defining void areas in the order of 80 to 94% of the volume of the filler.

2. The combination in accordance with claim 1 wherein said cellulostic fibers comprise discrete pieces of fragmented paper with resin rigidified central portions in partially creased form to produce columnar portions for transmitting load through said filler.

3. A structural member comprising a continuous skin of resin bonded sheet material defining a closed shape in cross section and a filler therein in bonded engagement with the skin and comprising a mass of random oriented cellulose particles in resin rigidified condition and defining a plurality of random positioned void regions constituting between 80 and 94% of the filler by volume;

said particles in three dimensional random orientations intersecting in irregular edge to edge, surface to surface and edge to surface junctions with edge fibers of adjacent particles in bonded engagement constituting a mass of rigid material;

said particles being in partly creased condition to produce columnar portions for transmitting load through said filler.

4. The combination in accordance with claim 3 wherein said sheet material comprises fiberglas.

5. The combination in accordance with claim 3 wherein said skin is in the order of 0.05 to 0.10 inch thick.

6. The combination in accordance with claim 3 wherein said filler has a ratio of resin to cellulostic particles by weight in the order of 1.9 to 5.1.

7. The combination in accordance with claim 3 wherein said filler comprises fragmented particles of paper.

8. The combination in accordance with claim 3 wherein said particles of paper have a mean particle size of 2 inches across or less.

* * * * *